United States Patent
Nelson

(10) Patent No.: US 6,250,652 B1
(45) Date of Patent: Jun. 26, 2001

(54) CHILD'S STROLLER

(76) Inventor: Charles D. Nelson, 41 Wooded Hill Ct., Pendleton, KY (US) 40055

( * ) Notice: Subject to any disclaimer, the term of this patent is extended or adjusted under 35 U.S.C. 154(b) by 0 days.

(21) Appl. No.: 09/116,730

(22) Filed: Jul. 16, 1998

(51) Int. Cl.[7] ................................................ B62B 9/10
(52) U.S. Cl. ..................... 280/47.38; 280/827; 280/62; 280/79.2
(58) Field of Search .................... 280/1.22, 1.23, 280/827, 828, 87.01, 87.051, 47.11, 47.12, 47.34, 47.25, 47.38, 47.4, 62, 79.2; D12/83; D21/250; 296/177

(56) References Cited

U.S. PATENT DOCUMENTS

| | | |
|---|---|---|
| 1,102,153 | 6/1914 | Jürgens . |
| 1,570,410 | 1/1926 | Strauss ............................... 280/47.38 |
| 2,450,979 | 10/1948 | Moller ................................. 280/293 |
| 2,676,054 * | 4/1954 | Pasin .................................. 280/87.01 |
| 2,775,462 * | 12/1956 | Biasell ............................... 280/87.01 |
| 2,836,427 | 5/1958 | Anderson ............................. 280/7.1 |
| 3,036,857 * | 5/1962 | Douglas .............................. 280/828 |
| 3,048,417 * | 8/1962 | Breen ................................. 280/87.01 |
| 3,048,420 * | 8/1962 | Umanoff .............................. 280/62 |
| 3,120,391 * | 2/1964 | Fletcher ............................. 280/87.01 |
| 3,137,250 * | 6/1964 | Hutchinson ........................ 280/47.34 |
| 3,173,396 | 3/1965 | Bradov ............................... 115/1 |
| 3,416,625 * | 12/1968 | Narutani ............................. 280/1.22 |
| 3,718,344 * | 2/1973 | Lohr et al. ......................... 296/177 |
| 3,791,662 * | 2/1974 | Glass et al. ....................... 280/827 |
| 3,826,326 * | 7/1974 | Blair ................................. 280/62 |
| 4,513,981 * | 4/1985 | DeGraaff et al. ................... 280/828 |
| 5,158,319 | 10/1992 | Norcia et al. ...................... 280/643 |
| 5,215,356 * | 6/1993 | Lin ................................... 280/47.38 |
| 5,228,716 * | 7/1993 | Dahl ................................. 280/47.34 |
| 5,261,690 * | 11/1993 | Kluber ............................... 280/47.4 |
| 5,263,730 * | 11/1993 | Roach et al. ....................... 280/62 |
| 5,265,912 * | 11/1993 | Natividad .......................... 280/62 |
| 5,499,835 * | 3/1996 | Skirchak, Jr. et al. ............. 280/62 |
| 5,645,290 | 7/1997 | Gaffney et al. .................... 280/33.998 |
| 5,931,524 * | 8/1999 | Jones, Jr. .......................... 296/177 |

FOREIGN PATENT DOCUMENTS

1458082 * 11/1966 (FR) .................................. 280/47.34

* cited by examiner

Primary Examiner—Frank Vanaman
(74) Attorney, Agent, or Firm—Maurice L. Miller, Jr.

(57) ABSTRACT

A stroller for a child is disclosed which includes a frame having two support surface engaging rear wheels rollably mounted on opposite sides of a rear end portion thereof and a single, support surface engaging swivel caster suspended from a front end portion of the frame on a longitudinal centerline thereof. A pair of spaced apart front wheels is rollably mounted on opposite sides of a front end portion of the frame in transverse and laterally spaced apart alignment with the caster. The front wheels are mounted on the frame so that the lower surfaces thereof are spaced slightly above the lower surface of the caster, whereby the front wheels normally do not touch the supporting surface when the load on the stroller is balanced along the centerline thereof and when the stroller is either stationary or moving in a straight line. However, the rollable front wheels act to stabilize the stroller and prevent it from turning over by alternately tilting over into rollable engagement with the supporting surface, as when a person pushing the stroller attempts to execute a sharp right or left hand turn at a relatively high forward speed. The stroller includes a miniature automobile body mounted on and effectively concealing the frame from view. A box shaped seat is mounted on the frame between the front and rear wheels under an opening in an upper surface of the automobile body.

8 Claims, 3 Drawing Sheets

CHILD'S STROLLER

BACKGROUND OF THE INVENTION

This invention relates generally to a child's stroller and, more particularly, to a child's stroller which has a stable and readily maneuverable three-point stance and which may also have an aesthetically pleasing appearance to children in the form of a miniature convertible automobile body or the like mounted on an underlying frame.

One of the optional features of the present invention is an open top, miniature convertible automobile body which can be mounted over a frame so as to essentially conceal the frame from view. Broadly speaking, such strollers have been known in the prior art such as the open top racer car shown in U.S. Pat. No. 5,645,290 issued to E. J. Gaffney et al. on Jul. 8, 1997. The racer car body contains fake front and rear wheels molded in the sides thereof which do not roll relative to the frame and body and which do not touch the stroller supporting surface. A pair of transversely spaced apart rear wheels are rollably mounted on vertically extending struts which are suspended under the racer car body from rear end portions of a frame. These rollable rear wheels are medially displaced from the fake rear wheels. A pair of transversely spaced apart front wheels in the form of swivel or pivotal casters are mounted under the racer car body and are suspended from a front end portion of the frame. These casters are medially displaced from the fake front wheels. The subject racer car stroller thus features a four point stance.

One of the problems encountered with a prior art stroller of the type shown in the Gaffney et al. patent is that the fake molded wheels on the sides of the racer car body lack realism and are aesthetically unpleasing as compared to a stroller car body having real rollable wheels.

Another feature of my invention is a frame having a stable highly maneuverable three point stance resulting from the use of a pair of spaced apart real wheels and a single swivel caster located under a front end portion of the frame on a longitudinal centerline of the stroller and frame. No such three point stance has been found by me on a stroller of the prior art. A clear advantage of such a single front swivel caster and three point stance is increased maneuverability over most prior art strollers which employ a four point stance. However, the three point stance results in instability, as where a person pushing such a stroller attempts to make a sharp right or left hand turn, particularly when moving forward at a relatively high speed, or when a load on the stroller is displaced from its longitudinal centerline, as where an occupant is seated or leans to one side thereof.

By means of my invention, the problem of instability using a stroller with a three point stance and other problems encountered using strollers of the prior art are substantially overcome.

SUMMARY OF THE INVENTION

It is an object of my invention to provide a novel child's stroller.

It is a further object of my invention to provide a child's stroller having a three point stance.

It is also an object of my invention to provide a child's stroller having a three point stance which is stable and not highly likely to turn over as when rapidly pushed through a sharp right or left hand turn or where the weight of an occupant is displaced from a longitudinal centerline of the stroller.

It is another object of my invention to provide a child's stroller which is both stable and readily maneuverable by a person pushing the same.

It is yet another object of my invention to provide a child's stroller having an aesthetically pleasing appearance such as in the form of a miniature convertible automobile having real wheels rollably mounted under fenders.

Briefly, in accordance with my invention, there is provided a child's stroller including a frame having a pair of support surface engaging rear wheels rollably mounted on a rear end portion thereof and a support surface engaging swivel caster suspended from a front portion of the frame on a longitudinal centerline thereof. The stroller also includes a body forming a housing which is mounted on the frame. The body defines an opening on an upper surface thereof which is capable of surrounding an occupant. The stroller further includes a seat for the occupant which is mounted on the frame within the body which is surrounded by the body opening. A handle is included which is attached to and which extends rearwardly from the frame for permitting a person to push and guide the stroller.

These and other objects, features and advantages of my invention will become apparent to those skilled in the art from a study of the following detailed description and attached drawings upon which, by way of example, only a preferred embodiment of my invention is described and illustrated.

DESCRIPTION OF THE PREFERRED EMBODIMENT

Figure 1:
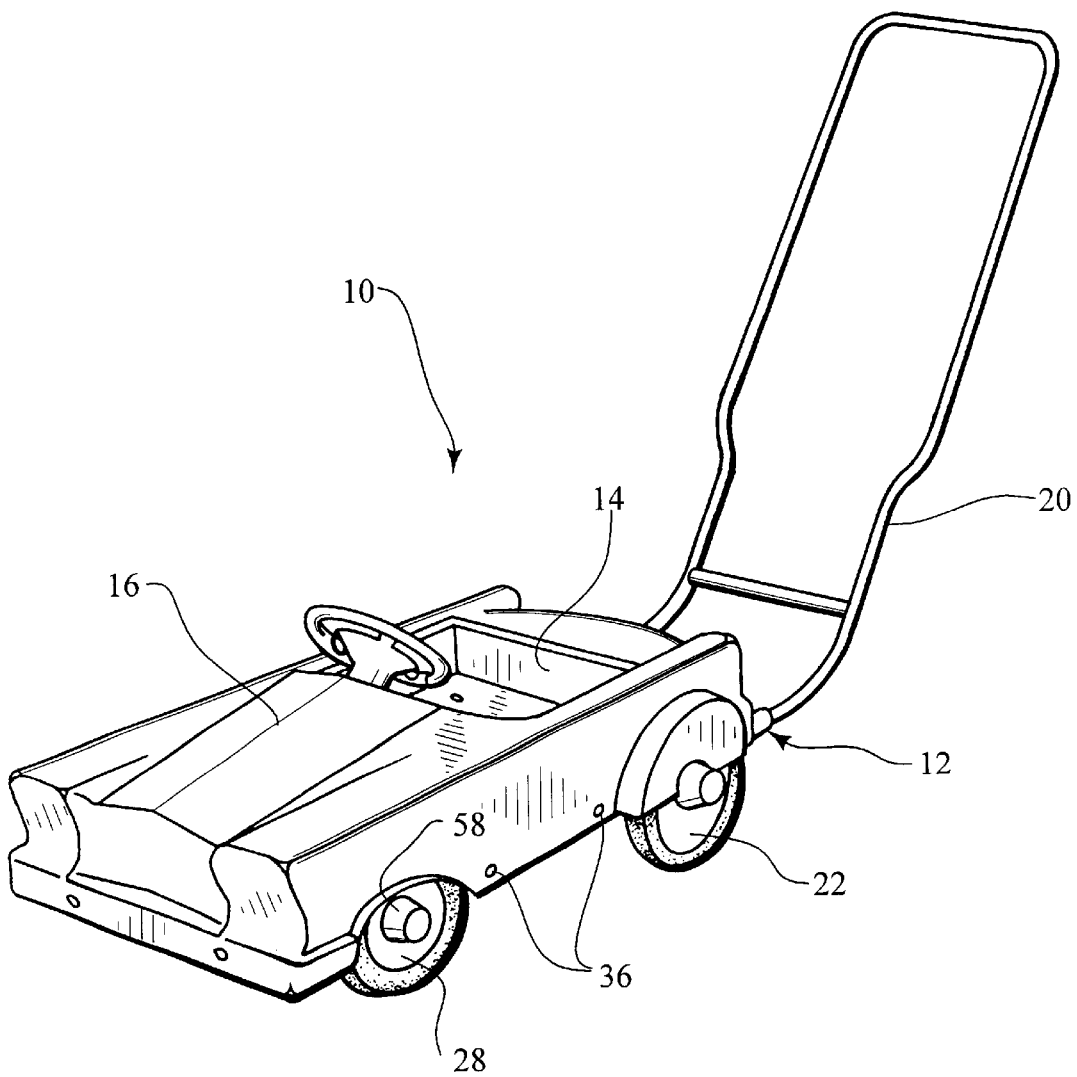
FIG. 1 shows a perspective view of a child's stroller including a frame, a box shaped seat and a miniature automobile body mounted on a portion of the frame, thus illustrating a preferred embodiment of my invention.

Referring now to the drawing figures, there is shown, in a preferred embodiment of my invention, a child's stroller, generally designated 10, three major components of which include a rigid frame, generally designated 12, a child supporting component in the form of an open top, box shaped seat 14 mounted on the frame, and an ornamental housing in the form of a miniature convertible automobile body 16 mounted on the frame 12 over and around the box seat 14. See particularly FIGS. 1 and 5. The frame 12 includes an automobile body and box seat supporting portion 18 and a U-shaped handle portion 20, both being preferably constructed of steel or light weight, high strength aluminum alloy. The box seat 14 is also constructed of steel or aluminum alloy and the automobile body 16 is preferably constructed of a conventional light weight molded polymer plastic. The body 16 defines an opening on an upper surface thereof which surrounds an open upper end of the box seat 14.

Figure 2:
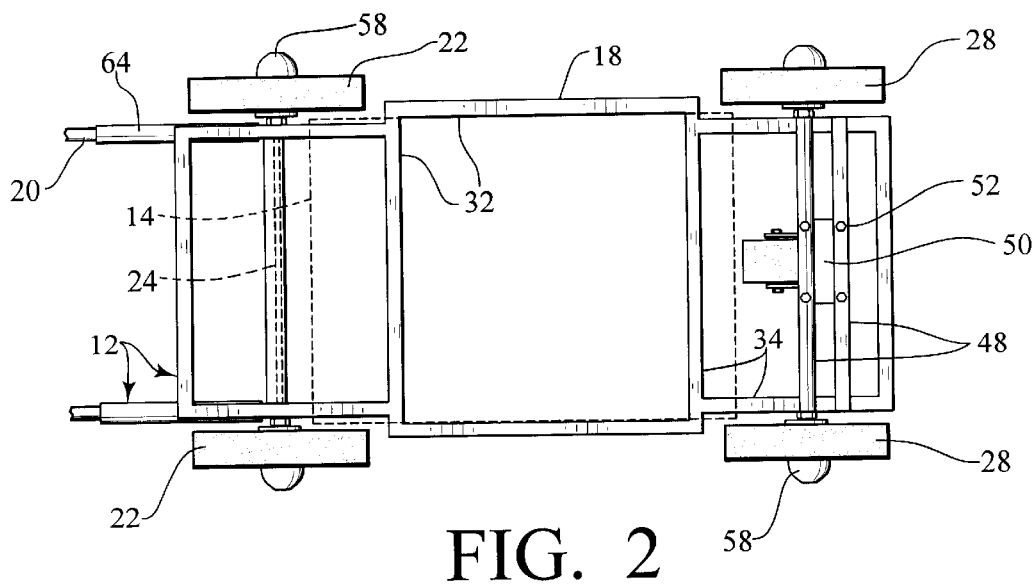
FIG. 2 shows a plan view of a portion of the frame of FIG. 1 with the box seat and automobile body being removed and with a handle portion of the frame being torn away.

The body and seat supporting frame portion 18 is supported by a pair of rear wheels 22 rollably mounted on a threaded rod 24, the rod being welded to the bottom of the supporting portion 18 near a rear end thereof, and by a single swivel caster 26 bolted or otherwise fixedly attached to the supporting portion 18 near a front end thereof. A pair of front wheels 28, which normally do not cooperate in supporting the stroller 10, as later more fully explained, are rollably connected to the supporting portion 18 in transverse or lateral, spaced apart alignment with the caster 26. The portion 18 forms three adjoining rectangular shaped sections 30, 32 and 34 as best seen in FIG. 2. The middle section 32 is located between the front and rear wheels 28 and 22, respectively, and is wider than the rear and front sections 30 and 34 so that the automobile body 16 can be bolted directly to opposite sides thereof, as by means of bolts or machine screws 36 (See FIGS. 1 and 5). The relatively narrower rear and front sections 30 and 34 permit spacing apart of the wheels 22 and of the wheels 28, respectively, so as to fit within the wheel fenders of the automobile body 16 as shown in FIG. 1.

Figure 3:
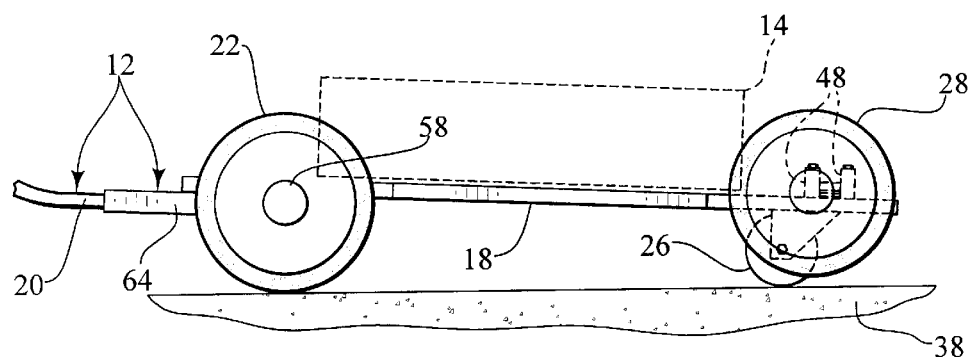
FIG. 3 shows a side elevation view of the frame portion of FIG. 2 resting on a supporting surface.
Figure 4:
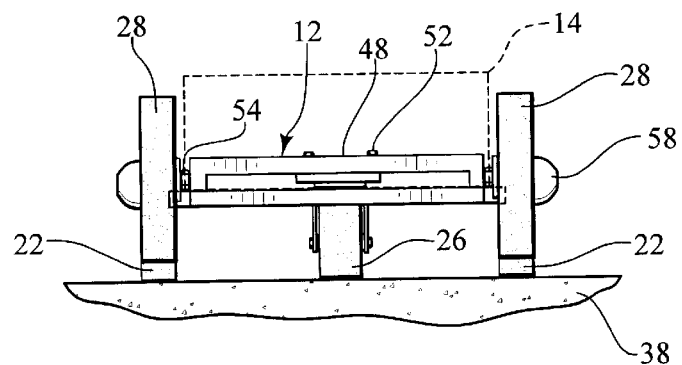
FIG. 4 shows a front elevation view of the frame portion of FIGS. 2–3 and supporting surface of FIG. 3.

As best seen in FIGS. 3–4, the rear wheels 22 and front caster 26 support the frame portion 18 in a three point stance on a supporting surface 38 under normal circumstances. Accordingly, the front wheels 28 may be slightly smaller in diameter than the rear wheels 22 and/or may be mounted higher on the frame portion 18 than are the rear wheels so that the front wheels float slightly above and do not normally touch the supporting surface 38 (FIGS. 3–4). However, the rollable front wheels 28, being normally close to the supporting surface 38 can alternately lean over into rolling engagement with the supporting surface to stabilize the stroller 10 as, for example, when a person pushing the stroller makes a sharp turn to the right or left or when an occupant of the stroller leans or shifts position to one side or the other of the longitudinal centerline of the stroller. This is a safety feature of the stroller 10 which is intended to help prevent the stroller it from being accidentally turned over, particularly when in motion.

Figure 5:
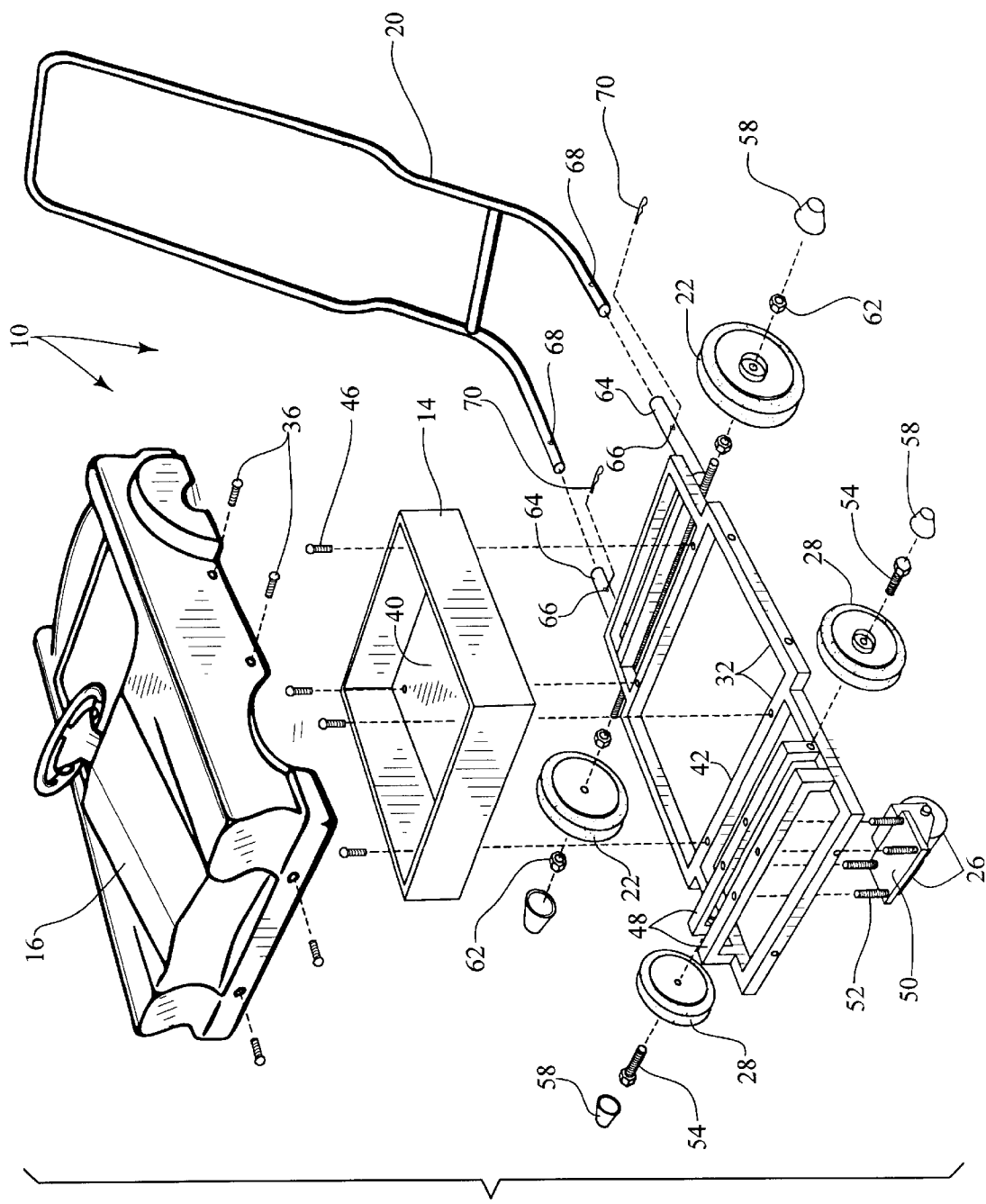
FIG. 5 shows an exploded perspective view of the automobile body, box seat and frame of FIG. 1 and frame portion of FIGS. 2–4, with all missing parts of the stroller of the latter mentioned figures being replaced.

As best seen in FIG. 5, the box seat 14 is mounted over the middle section 32 of the frame portion 18, a floor 40 of which is fastened to front and rear members 42 and 44 by four machine screws or bolts 46. A pair of parallel extending and spaced apart, inverted, U-shaped caster support members 48 are welded or, otherwise, fixedly attached in a suitable manner to opposite sides of the front section 34 so as to extend transversely across the frame portion 18. A mounting plate 50 of the caster 26 is then attached to an underside portion of the members 48 on a longitudinal centerline of the frame portion 18 (See FIGS. 2 and 4) by means of four machine screws or bolts 52. The front wheels 28 are rollably mounted on the shafts of bolts 54 which are threaded into tapped holes 56 formed in opposite ends of one of the members 48. Conventional plastic covers 58 snap fit onto collars 60 on the outer sides of the wheels 22 and 28 to conceal hex-nuts 62, which hold the rear wheels onto the threaded rod 24 and the hex heads of the bolts 54 on the front wheels, from view. A pair of hollow collars 64 are welded or otherwise suitably attached to the undersides of the rear section 30 of the frame portion 18 into which the legs of the U-shaped handle 20 are inserted in relatively close fitting relationship. Holes 66 formed in the collars 64 align with holes 68 formed in the handle portion 20, when the latter is properly inserted in the former, through which a conventional securing pin or cotter key 70 can be inserted to secure the handle portion to the frame portion 18 (See FIG. 5).

Although the present invention has been described and illustrated with respect to specific details of a certain preferred embodiment of my invention, it is not intended that such details limit the scope and coverage of this patent other than as specifically set forth in the following claims.

I claim:

1. A child's stroller comprising
   a frame having a pair of support surface engaging rear wheels rollably mounted on a rear end portion thereof and a support surface engaging swivel caster suspended from a front portion of said frame on a longitudinal centerline of said frame;
   a body forming a housing and being mounted on said frame, said body defining an opening on an upper surface thereof capable of surrounding an occupant;
   a seat for said occupant mounted on said frame within said body and being surrounded by said body opening;
   a handle attached to and extending rearwardly from said frame for permitting a person to push and guide said stroller; and
   an inverted U-shaped caster support element attached to opposite sides of a front portion of said frame so as to extend transversely across said front portion, said caster being suspended from said element, said element including a pair of longitudinally spaced apart, U-shaped members which are parallel with one another.

2. The stroller of claim 1 further comprising means for preventing said stroller from being overturned when said stroller is turned quickly and sharply to the right or left by a user.

3. The stroller of claim 1 further comprising a pair of front wheels mounted on a front end portion of said frame, said front wheels being disposed in spaced apart and transverse alignment with and on opposite sides of said caster, said front wheels being elevated slightly above said caster such that they are spaced above a support surface upon which said caster rests when said stroller is stationary and when said stroller is moving in a straight line on a level surface, said front wheels being alternately engagable with said support surface to prevent said stroller from being overturned when said stroller is turned quickly and sharply to the right or left by a user.

4. The stroller of claim 3 wherein said front wheels are of smaller diameter than said rear wheels.

5. The stroller of claim 1 wherein said body comprises a miniature imitation of a convertible automobile chassis.

6. The stroller of claim 1 wherein said frame comprises rectangularly shaped front, rear and central sections, the rear wheels being mounted on opposite sides of said rear one of said sections, the caster being suspended from said front one of said sections on a longitudinal centerline of said frame.

7. The stroller of claim 6 wherein said central one of said sections is wider than said front and rear ones of said sections.

8. The stroller of claim 1 wherein said seat is box shaped with closed lower end and an open upper end.

* * * * *